US010952139B2

(12) United States Patent
Asterjadhi et al.

(10) Patent No.: US 10,952,139 B2
(45) Date of Patent: Mar. 16, 2021

(54) WIRELESS COMMUNICATION INVOLVING A WAKE TIME PERIOD FOR A STATION

(71) Applicant: QUALCOMM Incorporated, San Diego, CA (US)

(72) Inventors: Alfred Asterjadhi, San Diego, CA (US); George Cherian, San Diego, CA (US); Simone Merlin, San Diego, CA (US); Sandip Homchaudhuri, San Jose, CA (US); Zhanfeng Jia, Belmont, CA (US); Sumeet Kumar, San Jose, CA (US); Pradeep Kumar Yenganti, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 183 days.

(21) Appl. No.: 15/470,645

(22) Filed: Mar. 27, 2017

(65) Prior Publication Data

US 2017/0280388 A1    Sep. 28, 2017

Related U.S. Application Data

(60) Provisional application No. 62/314,360, filed on Mar. 28, 2016.

(51) Int. Cl.
*H04W 52/02* (2009.01)
*H04W 74/00* (2009.01)
(Continued)

(52) U.S. Cl.
CPC ... *H04W 52/0216* (2013.01); *H04W 52/0229* (2013.01); *H04W 52/0235* (2013.01);
(Continued)

(58) Field of Classification Search
CPC ............. H04W 52/0216; H04W 28/0221
See application file for complete search history.

(56) References Cited

U.S. PATENT DOCUMENTS

2004/0264397 A1* 12/2004 Benveniste ............. H04L 12/12
370/311
2011/0069650 A1* 3/2011 Singh ................ H04W 52/0216
370/311

(Continued)

OTHER PUBLICATIONS

Asterjadhi A., et al., "Scheduled Trigger frames", IEEE 802.11-15/0880r2, Jul. 1, 2015, XP055363486, Retrieved from the Internet: URL:https://mentor.ieee.org/802.11/dcn/15/11-15-0880-02-00ax-scheduled-trigger-frames.pptx [retrieved on Apr. 10, 2017], 17 pages.

(Continued)

*Primary Examiner* — Shukri Taha
(74) *Attorney, Agent, or Firm* — Steven R. Thiel

(57) ABSTRACT

A method, an apparatus, and a computer-readable medium for wireless communication are provided. In one aspect, an apparatus is configured to receive information indicating a wake time period from a STA and use the received wake time period to schedule communication with the STA. The apparatus may use the received wake time period to determine a target transmission time for transmitting a trigger frame to the STA. The apparatus may transmit a beacon to the STA and then transmit the trigger frame to the STA at the target transmission time following the beacon. The apparatus may also indicate an offset from the beacon that the apparatus will use for communication with the STA based on the wake time period of the STA.

33 Claims, 10 Drawing Sheets

(51) Int. Cl.
*H04W 72/12* (2009.01)
*H04W 88/08* (2009.01)
*H04W 84/12* (2009.01)
*H04W 56/00* (2009.01)
*H04W 74/06* (2009.01)

(52) U.S. Cl.
CPC ... *H04W 72/1257* (2013.01); *H04W 72/1284* (2013.01); *H04W 74/002* (2013.01); *H04W 88/08* (2013.01); *H04W 52/028* (2013.01); *H04W 56/001* (2013.01); *H04W 74/06* (2013.01); *H04W 84/12* (2013.01); *Y02D 30/70* (2020.08)

(56) References Cited

U.S. PATENT DOCUMENTS

| | | | | |
|---|---|---|---|---|
| 2013/0188541 | A1* | 7/2013 | Fischer | H04W 72/06 370/311 |
| 2014/0098724 | A1* | 4/2014 | Park | H04W 72/02 370/311 |
| 2014/0112229 | A1 | 4/2014 | Merlin et al. | |
| 2014/0135051 | A1* | 5/2014 | Ghosh | H04W 52/0212 455/517 |
| 2015/0327262 | A1* | 11/2015 | Kwon | H04W 72/1289 370/329 |
| 2016/0150557 | A1* | 5/2016 | Lee | H04W 52/0206 370/338 |
| 2016/0269993 | A1* | 9/2016 | Ghosh | H04W 52/0229 |
| 2016/0323820 | A1* | 11/2016 | Wong | H04W 52/0209 |
| 2016/0381704 | A1* | 12/2016 | Chu | H04W 74/04 370/329 |
| 2017/0195954 | A1* | 7/2017 | Ghosh | H04W 52/0216 |

OTHER PUBLICATIONS

Fischer M., et al., (BROADCOM): "Target WakeTime; 11-12-0823-00-00ah-targetwaketime", IEEE SA Mentor; 11-12-0823-00-00AH-Targetwaketime, IEEE-SA Mentor, Piscataway, NJ USA, vol. 802.11ah, Jul. 16, 2012 (Jul. 16, 2012), pp. 1-16, XP068039343, [retrieved on Jul. 16, 2012].

International Search Report and Written Opinion—PCT/US2017/024563—ISA/EPO—dated Jun. 12, 2017.

Stacey R., (INTEL): "Proposed Draft Specification; 11-16-0024-01-00ax-proposed-draft-specification", vol. 802.11ax, No. 1, Mar. 3, 2016, XP068104773, pp. 1-160.

* cited by examiner

WIRELESS COMMUNICATION INVOLVING A WAKE TIME PERIOD FOR A STATION

CROSS-REFERENCE TO RELATED APPLICATION

This application claims the benefit of U.S. Provisional Application Ser. No. 62/314,360, entitled "Wireless Communication Involving a Wake Time Period for a Station" and filed on Mar. 28, 2016, which is expressly incorporated by reference herein in its entirety.

BACKGROUND

Field

The present disclosure relates generally to communication systems, and more particularly, to wireless communication between an Access Point (AP) and a Station (STA).

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims, which follow, some features will now be discussed briefly. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. After considering this discussion, and particularly after reading the section entitled "Detailed Description," one will understand how the features of this invention provide advantages for devices in a wireless network.

A STA may switch to a low power mode when the STA is not transferring data with an AP. While in the low power mode, the STA may periodically wake up in order to receive a beacon from the AP. When waking up to receive the beacon, the STA might turn on only a portion of the STA, e.g., only the components needed to receive the beacon. Thus, if the STA needs to communicate more actively with AP, the STA may need additional time to wake up fully. Such a period of time may be referred to as a wake time period. The AP does not know the amount of time that the STA will need to be ready to communicate more actively with the AP, and therefore must wait for the STA to indicate that it is ready or risk the STA missing communication that the AP intended for the STA. Waiting for a STA to indicate readiness to communicate leads to inefficiency in communication between the AP and the STA.

Aspects presented herein improve the efficiency of communication between an AP and a STA by having the STA provide the AP with an amount of time that it needs to be ready to receive and/or transmit communication with the AP when coming out of a lower power mode, e.g. a wake time period. The AP receives this wake time period and uses it to schedule communication with the STA.

In an aspect of the disclosure, a method, a computer-readable medium, and an apparatus are provided. The apparatus may be, e.g., an AP for wireless communication. The apparatus may be configured to receive information indicating a wake time period from a STA. The apparatus may then use the received wake time period to schedule communication with the STA.

The information indicating the wake time period may be received from the STA in an association request frame, e.g., in a high efficiency (HE) capabilities information element (IE) within the association request frame.

In an aspect, the apparatus may use the received wake time period to determine a target transmission time for transmitting a trigger frame to the STA. The apparatus may transmit a beacon to the STA and may then transmit the trigger frame to the STA at the target transmission time following the beacon. The apparatus may also indicate an offset from the beacon that the apparatus will use for communication with the STA. The apparatus may indicate the offset to the STA, e.g., in any of a broadcast Target Wake Time (TWT) IE transmitted in the beacon, an additional field in the beacon, or an association response frame from the apparatus.

DETAILED DESCRIPTION

Figure 1:
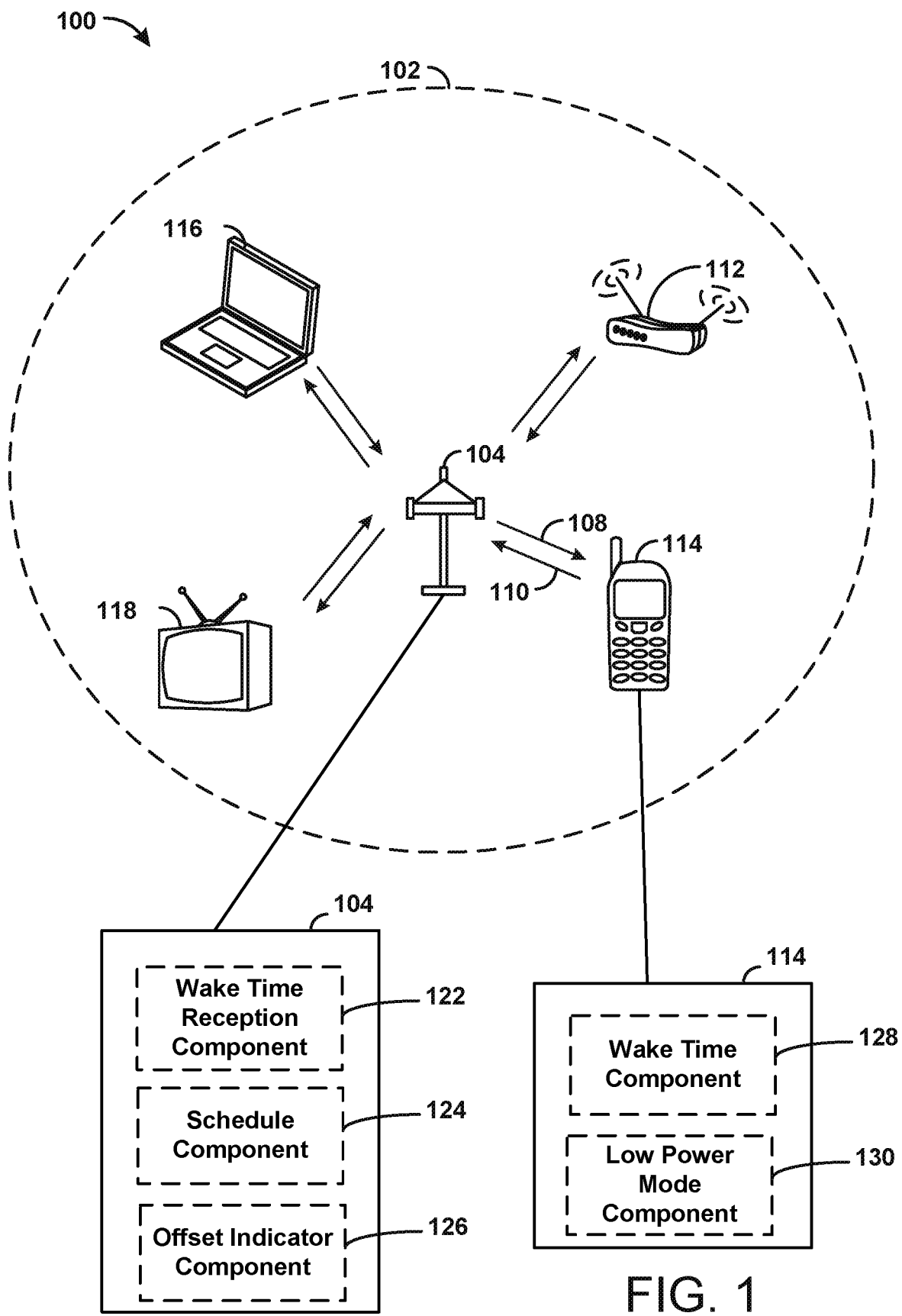
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method, which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices, which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A STA may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a STA may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare.

They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA, DSSS, MIMO techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system. In certain embodiments the signals can be sent at the same time to multiple STAs using but not limited to multi-user (MU) OFDMA, MU MIMO techniques or combinations therein. Similarly the signals can be sent to the AP at the same time by multiple STAs using but not limited to MU OFDMA, MU MIMO techniques or combinations therein. In certain embodiments these transmissions from multiple STAs in MU mode can be triggered by the AP by transmitting a Trigger frame.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, either from the beacon or probe response frames, the STA 114 may transmit a reference signal, such as an association probe or request, to the AP 104. In some aspects, the AP 104 may use backhaul services, for example, to communicate with a larger network, such as the Internet or a public switched telephone network (PSTN).

There may be different connection states for a STA and AP. The STA 114 may be not authenticated and not associated with the AP 104. The STA 114 may be authenticated, but not yet associated with the AP 104. The STA 114 may be authenticated and associated with the AP 104. The STA may need to be both authenticated and associated with AP 104 before AP 104 bridges traffic between STA 104 and other devices on the network. Thus, before STA 114 can send or receive traffic through AP 104, it may need to be in the appropriate connection state.

STA 114 may start out as not authenticated and not associated. STA may send a probe request to discover networks within its proximity. Such a probe request may advertise the STA's supported data rates and capabilities. When AP 104 receives the probe request, it may check to see if the STA has appropriate capabilities, such as at least one common supported data rate. If they have compatible data rates, the AP may send a probe response advertising the Service Set Identifier (SSID), or wireless network name, supported data rates, encryption types if required, other capabilities of the AP 104, etc.

STA 114 may choose compatible networks from the probe responses it receives. Once compatible networks are discovered STA 114 may attempt a low-level authentication with a compatible AP(s). AP 104 may receive the authentication frame and respond to STA 114 with an authentication response frame.

At this point, the STA 114 is authenticated but not yet associated with AP 104. STA may then send an association request to that AP 104. The association request may contain chosen encryption types, if required, and other STA capabilities.

If the elements in the association request match the capabilities of the AP 104, the AP 104 may create an Association ID for the STA 114 and respond with an association response, e.g., with a success message granting network access to the STA 114.

The STA is then successfully associated to the AP and data transfer can begin between the STA 114 and the AP 104.

The AP may then transmit a periodic beacon announcing its presence and providing information to the STA 114.

At times, the STA 114 may use a power saving mode, also referred to as a low power mode or a sleep mode, when STA 114 is not transferring any data with the AP 104. For example, STA 114 is illustrated as having a low power mode component 130 that may control operations of the STA 114 in connection with a low power mode. While in the low power mode, the STA may periodically wake up in order to receive a beacon from the AP 104.

When waking up from the low power mode in order to receive a beacon, the STA might wake up only a portion of the STA. The STA might power only the components needed to receive the beacon, e.g., without turning on a transmitter. Thus, the STA might receive the beacon while still partly in the sleep mode. If the STA needs to communicate with AP more actively, the STA may need additional time to fully wake up and be ready to transmit to the AP and/or receive communication from the AP. This additional time may include time to turn on additional components of the STA and may be referred to as a wake time period.

In one example, rather than arbitrarily transmitting data to the STA 114, the AP 104 may buffer DL frames for the client/STA. The AP may then periodically announce which STAs have data frames buffered in the AP buffer. This announcement may be made in the beacon from the AP, e.g., in a Traffic Indication Map (TIM) included in the beacon or generically in a management frame (another example is the TIM Broadcast frame) that is intended to one or more of the STAs associated with the AP. When the STA receives an indication that it has frames buffered at the AP, the STA may send a polling message to the AP to indicate that it is ready to receive any buffered frames. The polling message can be a Power Save Poll (PS-Poll) frame or any frame that acts as an APSD trigger frame. Examples include QoS Null frames transmitted by the STA to the AP. In the following, the description will be focused to the PS_Poll frame however, those skilled in the art may recognize that the same description is applicable to any frame that is transmitted by a STA that is or transitions from power save mode. The STA may power up its transmitter to transmit the PS-poll frame to indicate that it is ready to receive the data.

In this example, the AP does not know the amount of time that the STA 114 will need to turn on fully after receiving the beacon such that it can transmit the PS-Poll frame. Therefore, the AP must wait for the STA to indicate that it is ready to receive before communicating with the STA or risk the STA missing the communication the AP intended for the STA. Waiting for an indication of readiness from the STA leads to inefficiency in communicating with the STA. For example, the AP must wait for the STA to be ready to transmit, before requiring the STA to transmit a PS-Poll frame to indicate its availability to receive frames. This is particularly the case when the AP triggers the STA to transmit its PS-Poll frames as an (immediate, or in SIFS) response to a trigger frame, wherein the trigger frame may be configured to solicit PS-Poll frames from one or more STAs in MU mode. In such an example, the AP may need to ensure that all the STAs that are the intended receivers of the trigger frame are able to respond to the Trigger frame. This may be achieved by ensuring that the AP transmits its trigger frame after the longest timeout of all of the STAs scheduled in the trigger frame has expired.

Aspects presented herein improve the efficiency of communication between an AP and a STA by having the STA 114 provide the AP 104 with an amount of time that it requires to wake up from a sleep state to be ready to receive and/or transmit communication with the AP 104. This may be a minimum amount of time required by the STA to be ready to communicate more actively with the AP. This amount of time required by the STA may be referred to as a "wake time period." This amount of time may be provided by the STA to the AP during association as part of an information element that is included in the association request frame, or in any management frame exchanged with the AP. In certain examples, the AP may use default values for the wake time period based on the type of STA. In certain examples, the STA may send a TWT request frame to the AP with the wake time period included in the Minimum TWT Wake Duration field of the frame. In this example, the TWT request frame may contain the time offset to the next beacon the STA intends to receive, and the periodicity of the beacons it intends to receive from the AP. As a response the AP may send a TWT response frame confirming (or modifying, rejecting) these parameters.

As an example, if the STA is a limited capability device (as indicated during association or operation) then the AP may determine to use a longer wake time period for the STA while it may use a shorter wake time period if the STA is a high capability device. In certain examples, the STA may signal this limitation when it receives a Trigger frame to which it cannot respond in time due to its transmitter not being fully powered. In this case the STA may subsequently send a frame to the AP requesting a wake time period prior to being able to respond to trigger frames.

The AP 104 may then use the wake time period of the STA to communicate with the STA, e.g., without requiring an additional indication that the STA is ready when the STA is operating in power save mode. The AP may consider the wake time period of the STA in soliciting different UL responses, such as PS-POLL, Channel Quality Information (CQI), block ACK frames, buffer status reports, and/or data. This allows the AP to take into account the amount of time that the STA needs to turn on its transmitter when waking from a sleep state when scheduling or soliciting these types of UL responses. In an example, the AP may start a count down that is based on the wake time period starting from the end of the beacon (that contains for example a TIM bit for the STA to 1) or starting from the end of the latest group addressed (or broadcast frame) that is expected to be received by at least that STA. Once the count down reaches zero, the AP can transmit a Trigger frame to the STA to solicit any of the above mentioned UL frames.

In an aspect, the STA 114 may include one or more components for performing various functions. For example, the STA 114 may include a low power mode component 130 for operating in a low power mode and a wake time component 128 configured to transmit a wake time requirement for the STA to be ready to wake up from the low power mode to the AP 104. Similarly, the AP 104 may include one or more components for performing various functions. For example, the AP 104 may include a wake time reception component 122 configured to receive the wake time period from the STA 114, a schedule component 124 configured to use the wake time requirement received from the STA to schedule communication with the STA 114, and/or an offset indicator component 126 configured to indicate an offset for communication with the STA. For example, the AP 104 may use the wake time requirement as a time offset from the transmission of the beacon before transmitting any additional DL communication to the STA 114 that would require an UL response by the STA. Additionally, the AP 104 may use the wake time requirement information received from the STA 114 to determine a target time offset from the beacon at which it will anticipate UL communication from the STA 114. The offset indicator component 126 may indicate the offset from the beacon to the STA 114. In an example, the offset indicator may indicate the offset from the latest frame that is intended for the STA that does not require a response from the STA (wherein the frame may be individually addressed, group addressed or broadcast).

At times, the AP may indicate a target transmission time for a trigger frame. For example, a triggered TWT may be broadcast by including a TWT element in the beacon transmitted from the AP. When the broadcast triggered TWT is enabled, the STA 114 and AP 104 may exchange a TWT request/response to indicate the target beacon frame to be monitored by the STA 114. As described herein, the AP 104 may use the wake time period that it receives from the STA in order to determine the TWT. Thus, the offset for the broadcast TWT slot with respect to the beacon, or multicast packet, may be selected by the AP by considering the wake time period for the STA.

Figure 2:
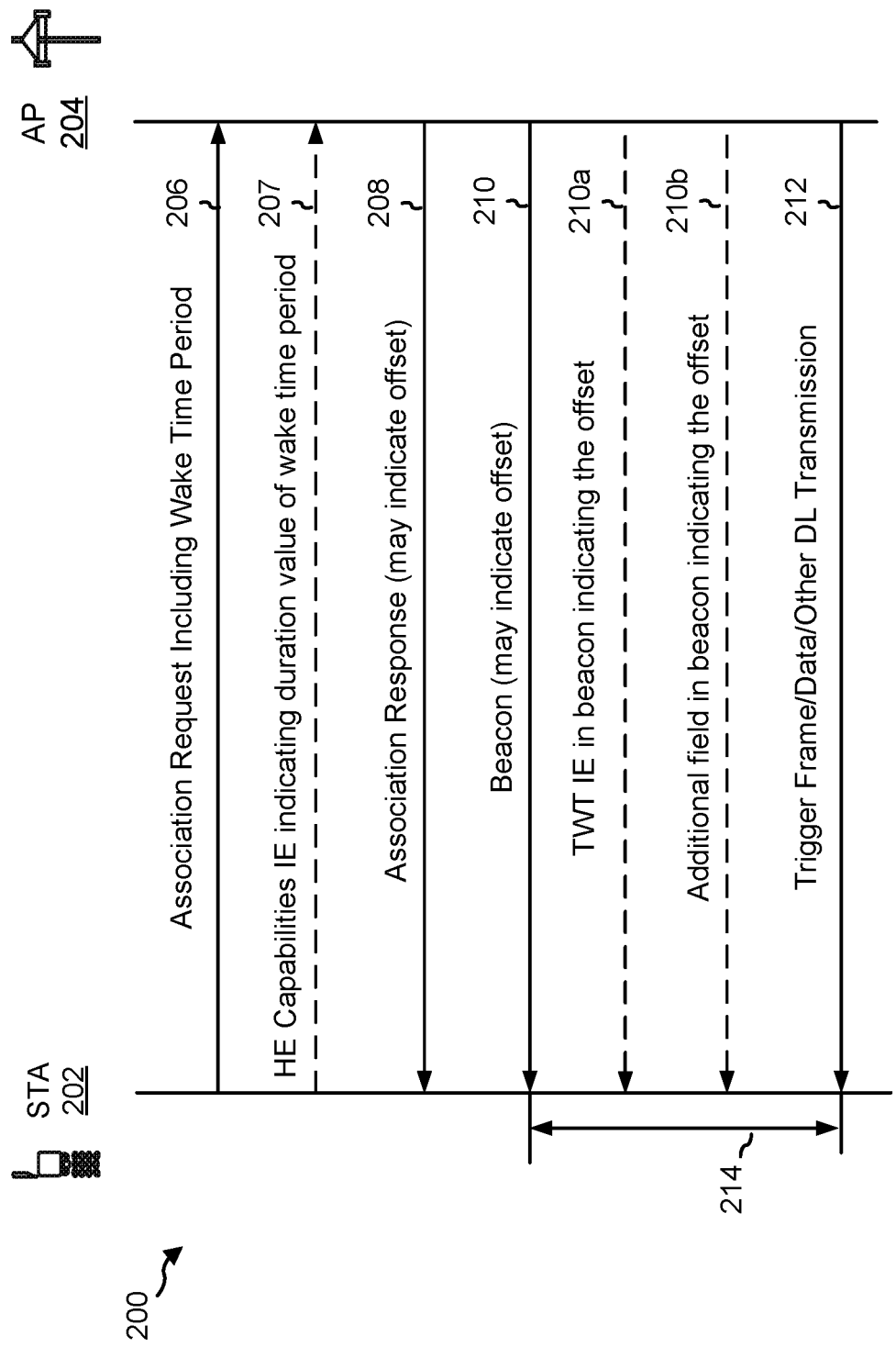
FIG. 2 shows an example communication diagram for communication between an AP and a STA.
Figure 3:
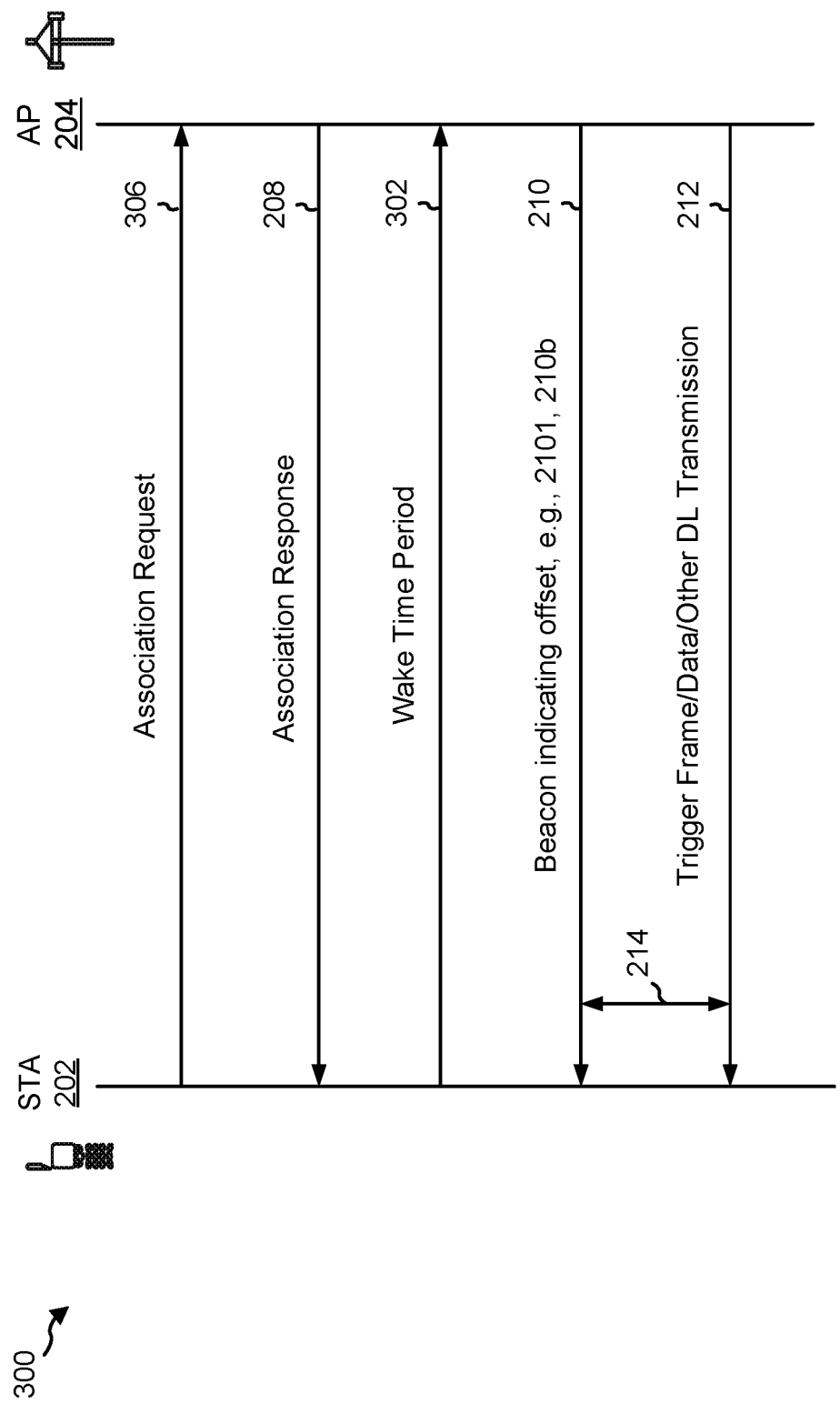
FIG. 3 shows an example communication diagram for communication between an AP and a STA.
Figure 4:
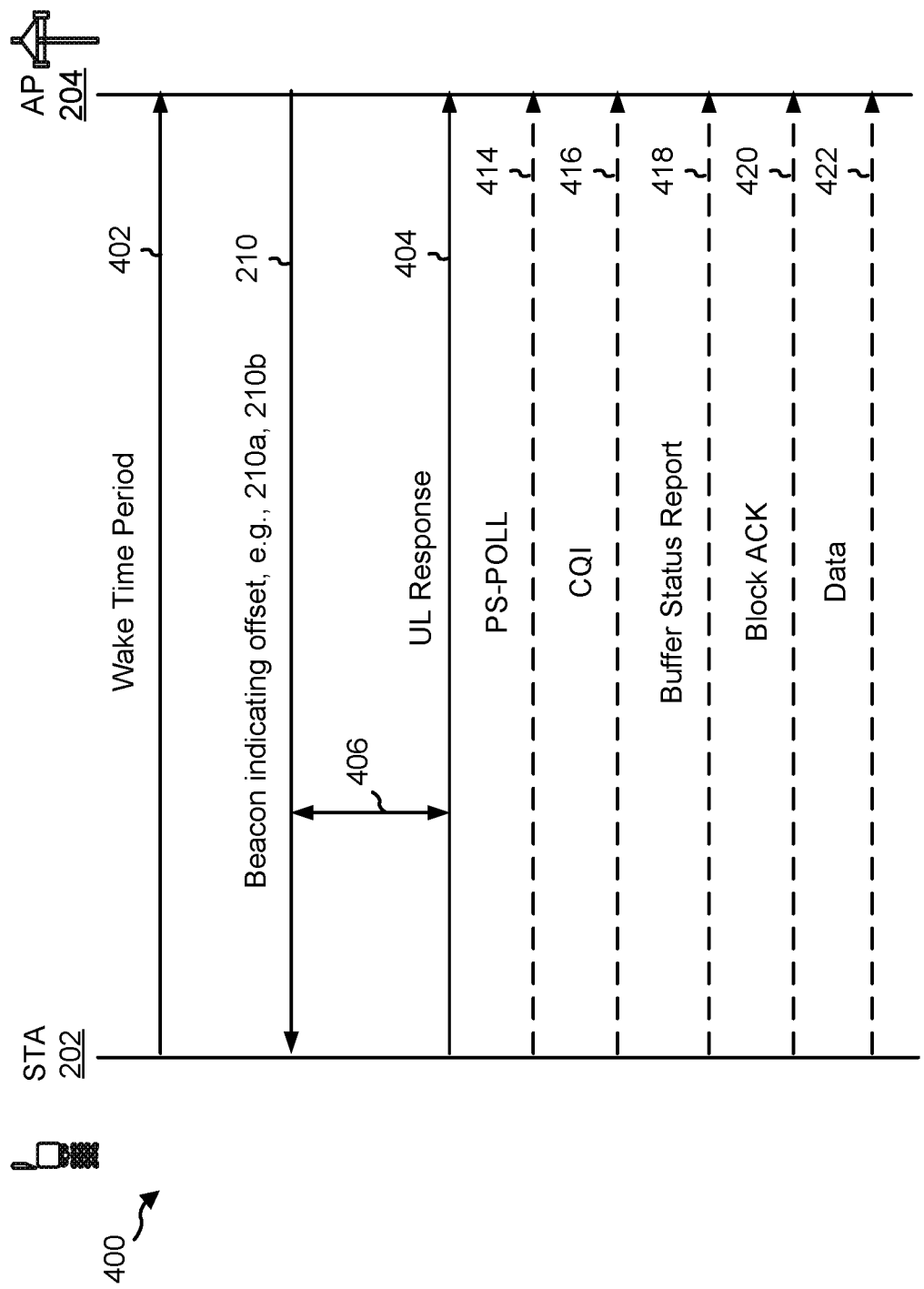
FIG. 4 shows an example communication diagram for communication between an AP and a STA.

The STA 114 may indicate its wake time period to the AP 104 in a number of ways. For example, FIGS. 2 and 3 provide examples of different ways in which a STA may provide this indication to the AP. FIGS. 2-4 also illustrate ways in which the AP may consider the wake time period of the STA in scheduling transmission times for various communication with the STA.

FIG. 2 illustrates a communication flow diagram 200 showing one example of wireless communication between a STA 202 and AP 204 in accordance with aspects presented herein. STA 202 may correspond to STA 112, 114, 116, 118, 750, wireless device 902, and AP 204 may correspond to AP 102, 700, wireless device 502. In FIG. 2, the STA provides the AP with an amount of time that it requires to wake up from a sleep state to be ready to receive and/or transmit communication with the AP, e.g., a wake time period. FIG. 2 illustrates an example where the STA 202 provides the wake time period information during association. For example, the STA 202 may provide the wake time period to the AP 204 along with an association request 206. For example, the STA 202 may indicate a duration value of its wake time period using a HE capabilities IE 207 during association.

The AP 204 responds to the association request 206 with an association response 208. The association response frame sent from the AP to the STA may include an acceptance or rejection to the STA's association request 206.

Once the STA 202 is associated with AP 204, the AP may then transmit a periodic beacon 210 announcing the AP's presence and providing information to the STA 202.

The AP 204 may consider the wake time period received from the STA 202 when determining a transmission time for transmitting DL communication 212 to the STA 202 that would require a response by the STA, e.g., following the beacon 210. The DL communication may be scheduled to have an offset 214 from the beacon (or more generally from the latest frame that does not require a response by the STA) that is at least as long as the wake time period for the STA.

Such DL communication 212 may include a trigger frame transmitted from the AP 204 to the STA 202. For example, when the beacon 210 contains a broadcast TWT element indicating the presence of TWTs following the beacon, the TWT spacing 214 that follows the beacon may be selected based on the wake time period for the STA 202.

The AP 204 may indicate the offset 214 for a broadcast TWT slot with respect to the beacon 210, or a multicast packet, in any of a number of ways. The AP 204 may indicate the offset to the STA 202 using a broadcast TWT IE 210*a* sent in the beacon 210. The AP 204 may indicate the offset to the STA 202 using a new field 210*b* defined in the beacon 210. The AP 204 may indicate the offset to the STA 202 using a fixed value indicated in the association response 208.

The STA 202 may use the offset information indicated by the AP 204 in order to know when to expect DL communication from the AP, e.g., how much time following the beacon 210 the UE should expect DL communication from the AP.

In another example, the DL communication 212 may include data rather than a trigger frame. Thus, the AP 204 may assume that the STA 202 is awake and ready to receive data beginning at an offset 214 from the beacon, the offset 214 being based on the wake time period information received from the STA. The AP 204 may make this assumption and transmit data without requiring additional signaling from the STA 202 that it is ready to receive data.

The DL communication 212 is not limited to a trigger frame or data, and the DL communication may include any additional DL information that the AP sends to the STA after the STA has been in a sleep state.

Although FIG. 2 illustrates the wake time period being sent by the STA 202 to the AP 204 in the association request 206, the STA may indicate the wake time period to the AP at other ways.

FIG. 3 illustrates an example diagram 300 in which the STA 202 provides the wake time period information 302 to the AP 204 separately from the association request 306. The same reference numbers are used to refer to features already described in connection with FIG. 2. FIG. 3 illustrates the wake time period information 302 being transmitted to the AP 204 after the association request 306 and the association response 208. This is only one example shown to illustrate that the wake time period may be indicated separately from the association request 306. The wake time period information 302 may also be sent prior to the association request 306 and/or association response 208.

FIGS. 2 and 3 illustrates examples in which the AP 204 uses the wake time period to schedule DL communication with the STA 202. However, the AP 204 may also use the wake time period to schedule UL communication from the STA 202.

FIG. 4 illustrates an example, in which the AP 204 uses the wake time period of the STA to schedule or solicit UL responses from the STA 202. The AP 204 may consider the wake time period of the STA to determine a spacing from the beacon after which it will solicit UL responses from the STA.

The AP may use a TWT, based on the wake time period information 402 received from the STA 202, in order to solicit or schedule different UL responses 404 from the STA 202. The wake time period 402 may be sent during association, as illustrated in FIG. 2 or separately from association, as illustrated in FIG. 3.

Among others, the UL response 404 transmitted from the STA 202 to the AP 204 may include a PS-POLL response 414 from the STA 202, a CQI response 416 from the STA 202, a buffer status report 418 from the STA 202, block ACK frames 420 from STA 202, a data transmission 422 from STA 202, etc. Thus, the AP 204 may consider the wake time period required by the STA 202 in soliciting such UL responses from the STA 202. The AP 204 may schedule or anticipate an UL response at an offset 406 from beacon 210, the offset being based on the wake time requirement of the STA 202. As described in connection with FIG. 2, the AP may indicate the offset 406 timing, e.g., with respect to the beacon 210 using, among others, a broadcast TWT IE sent in the beacon 210, a new field defined in the beacon 210, and/or a fixed value indicated using the association response 208.

Figure 10:
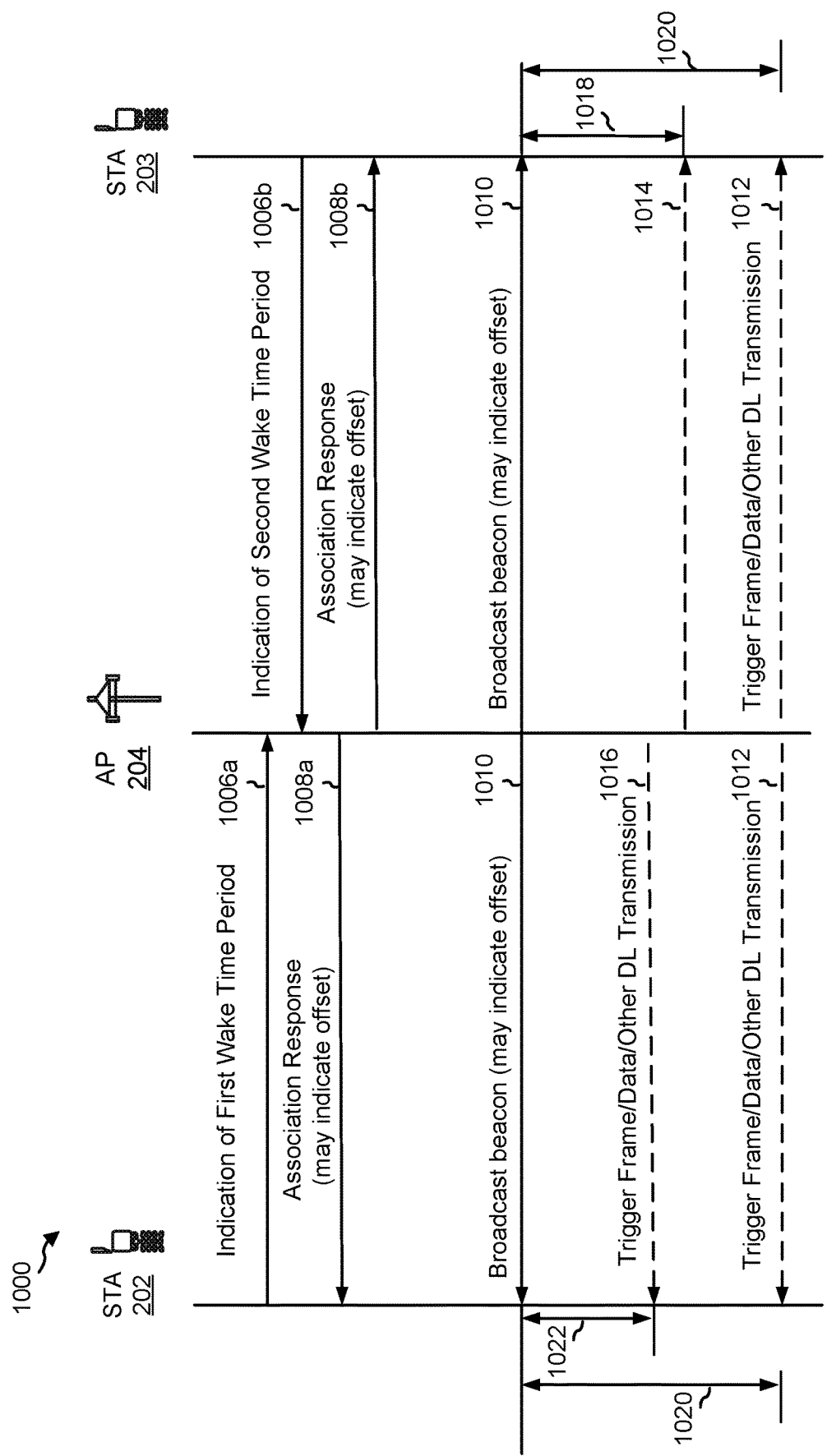
FIG. 10 shows an example communication diagram for communication between an AP and multiple STAs.

FIG. 10 illustrates an example communication flow 1000 in which AP 204 may communication with more than one STA, e.g., STA 202 and also STA 203. Although this example illustrates only two STAs, the aspects may be applied to an AP communicating with any number of STAs. STA 202 and STA 203 may have different wake time periods which need to be taken into account at AP 204. As illustrated in FIG. 10, STA 202 provides the AP with an indication 1006*a* of a first wake time period, e.g., an amount of time that STA 202 requires to wake up from a sleep state to be ready to receive and/or transmit communication with the AP 204. STA 203 provides the AP with an indication 1006*b* of a second wake time period, e.g., an amount of time that STA 203 requires to wake up from a sleep state to be ready to receive and/or transmit communication with the AP 204. The indications may be provided during association, as described in connection with FIG. 2 or may be sent in a separate transmission, as described in connection with FIG. 3.

The AP 204 responds to each STA with an indication of an offset, which may be comprised in the respective association responses 1008*a*, 1008*b* to STA 202, STA 203.

Once STA 202 and STA 203 are associated with AP 204, the AP may then broadcast a periodic beacon 210 announcing the AP's presence and providing information to the STA 202. The beacon may comprise an indication of the offset rather than the association responses 1008*a*, 1008*b*. As illustrated in FIG. 10, beacon 1010 broadcast to more than one STA, e.g., STA 202 and STA 203. When the beacon contains a broadcast TWT element indicating the presence of TWTs following the beacon, the TWT spacing that follows the beacon may consider the wake time requirements of the STAs, e.g., STA 202, STA 203. The TWT spacing 1020 may be the same for the different STA, as illustrated for the spacing 1020 between beacon 1010 and trigger frame, data, or other DL transmission 1012. In this example, the AP may consider the longest wake time period received from STA 202, 203.

In another example, the AP may consider the different wake time requirements of the STAs in scheduling communication directed to each of the STAs. In this example, the broadcast TWT element may indicate a TWT spacing for each corresponding STA or the beacon may comprise a broadcast TWT element corresponding to each STA for which the AP received a wake time period. Thus, the TWT offset 1018, 1022 may be different for the different STAs, as illustrated for the offset 1018 between beacon 1010 and trigger frame, data, or other DL transmission 1014 to STA 203 and offset 1022 between beacon 1010 and trigger frame, data, or other DL transmission 1016 to STA 202. In this example, the AP 204 may base the offset for each respective STA on the wake time period for that STA.

Figure 5:
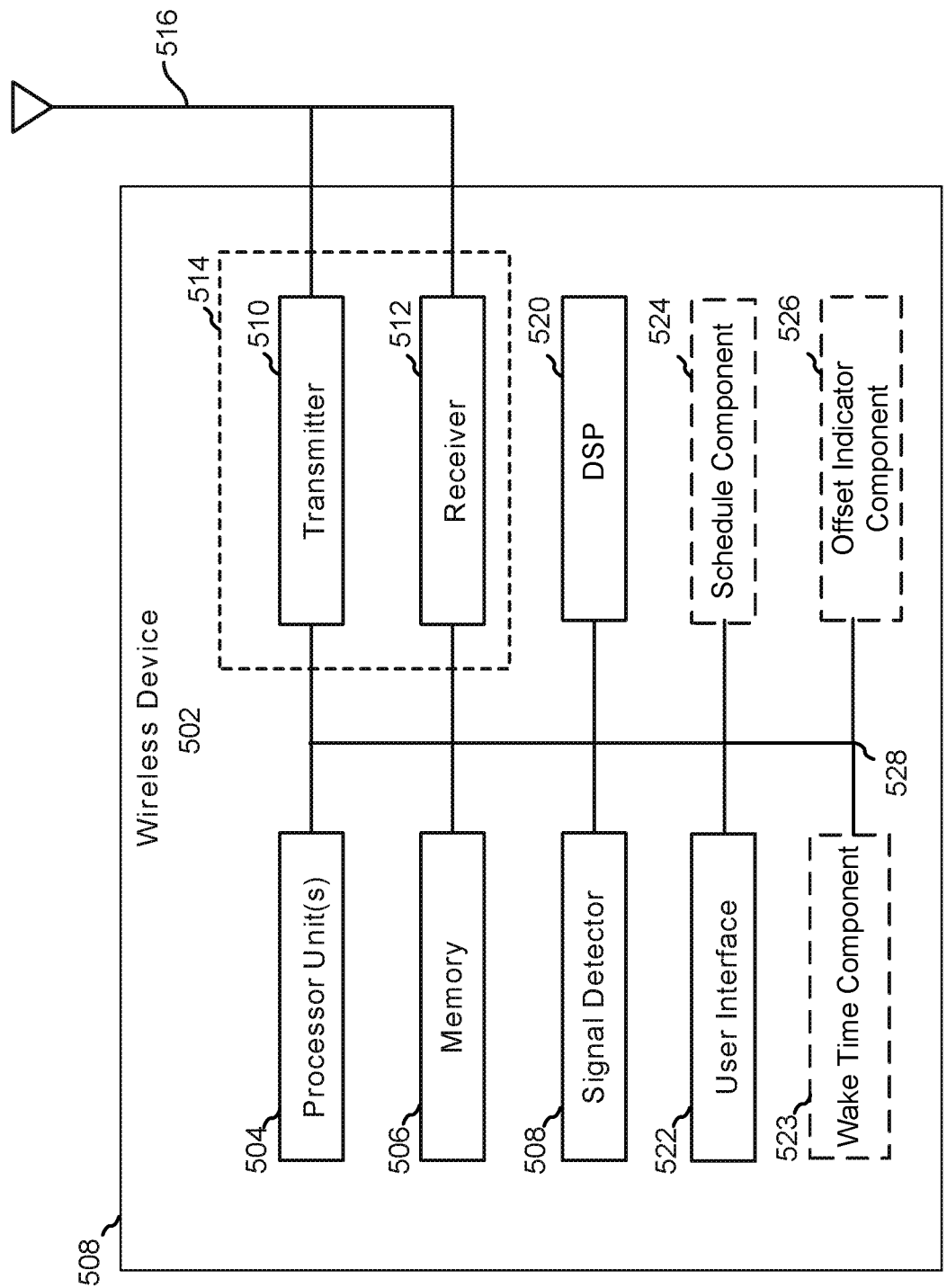
FIG. 5 shows an example functional block diagram of a wireless device that may use a wake time period to schedule communication with a STA, e.g., within the wireless communication system of FIG. 1.

FIG. 5 shows an example functional block diagram of a wireless device 502 that may communicate with a STA, e.g., within the wireless communication system 100 of FIG. 1. The wireless device 502 is an example of a device that may be configured to implement the various methods described herein, by considering a wake time period of a STA when communicating with the STA. For example, the wireless device 502 may comprise/be comprised in the AP 104, 204, wireless device 700.

The wireless device 502 may include at least one processor 504, which controls operation of the wireless device 502. The processor 504 may also be referred to as a central processing unit (CPU). Memory 506, which may include both read-only memory (ROM) and random access memory (RAM), may provide instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable (by the processor 504, for example) to implement the methods described herein.

The processor 504 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 502 may also include a housing 508, and the wireless device 502 may include a transmitter 510 and/or a receiver 512 to allow transmission and reception of data between the wireless device 502 and a remote device. The transmitter 510 and the receiver 512 may be combined into a transceiver 514. An antenna 516 may be attached to the housing 508 and electrically coupled to the transceiver 514. The wireless device 502 may also include multiple transmitters, multiple receivers, multiple transceivers, and/or multiple antennas.

The wireless device 502 may also include a signal detector 518 that may be used to detect and quantify the level of signals received by the transceiver 514 or the receiver 512. The signal detector 518 may detect such signals as total energy, energy per subcarrier per symbol, power spectral density, and other signals. The wireless device 502 may also include a DSP 520 for use in processing signals. The DSP 520 may be configured to generate a packet for transmission. In some aspects, the packet may comprise a physical layer convergence protocol (PLCP) data unit (PPDU).

The wireless device 502 may further comprise a user interface 522 in some aspects. The user interface 522 may comprise a keypad, a microphone, a speaker, and/or a display. The user interface 522 may include any element or component that conveys information to a user of the wireless device 502 and/or receives input from the user.

When the wireless device 502 is implemented as an AP (e.g., the AP 104, 204, wireless device 700), the wireless device 502 may also comprise a wake time component 523, a schedule component 524 and/or an offset indicator component 526. The wake time component 523 may be configured to receive a wake time period from a STA in a low power mode. The schedule component 524 may be configured to use the received wake time period to schedule communication with the STA, e.g., by performing functions and/or steps recited in disclosure with respect to FIGS. 1-4 and 6-7. The wireless device 502 may also comprise an offset indicator component 526 configured to indicate an offset to a STA, e.g., by performing functions and/or steps recited in disclosure with respect to FIGS. 1-4 and 6-7. The various components of the wireless device 502 may be coupled together by a bus system 528. The bus system 528 may include a data bus, for example, as well as a power bus, a control signal bus, and a status signal bus in addition to the data bus. Components of the wireless device 502 may be coupled together or accept or provide inputs to each other using some other mechanism.

Although a number of separate components are illustrated in FIG. 5, one or more of the components may be combined or commonly implemented. For example, the processor 504 may be used to implement not only the functionality described above with respect to the processor 504, but also to implement the functionality described above with respect to the signal detector 518, the DSP 520, the user interface 522, the schedule component 524, the offset indication component 526, the receiver 512, and/or the transmitter 510. Further, each of the components illustrated in FIG. 5 may be implemented using a plurality of separate elements.

Figure 6:
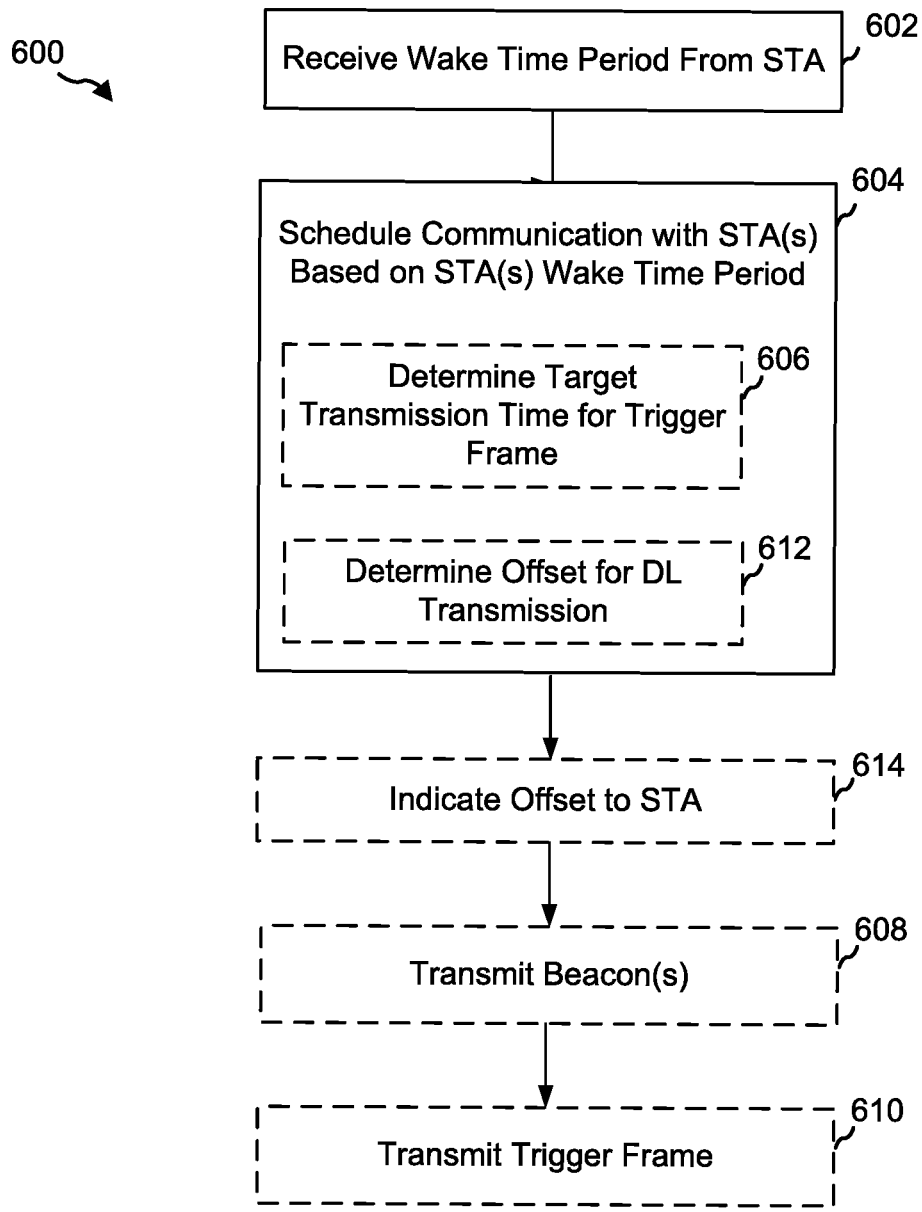
FIG. 6 shows a flowchart of an example method of wireless communication at an AP.

FIG. 6 is a flowchart of an example method 600 of wireless communication at an AP. Optional aspects are illustrated using a dashed line. The method 600 may be performed using an apparatus (e.g., the AP 104, 204 or the wireless device 502, 700, for example). Although the method 600 is described below with respect to the elements of wireless device 502 of FIG. 5, other components may be used to implement one or more of the steps described herein.

At 602, the AP may receive information indicating a wake time period from a STA, such as STA 114, 202, 203, or wireless device 902. The STA may be in a low power mode and the wake time period may correspond to an amount of time required by the STA to be ready to more actively communicate with the AP. The information indicating the wake time period may be received from the STA in an association request frame, e.g., in an HE capabilities IE within the association request frame. For example, receiver 512 in wireless device 502 may receive the wake time period.

At 604, the AP uses the received wake time period to schedule communication with the STA. For example, schedule component 524 in wireless device 502 may schedule the communication with at least one STA using the received wake time period. The AP may schedule the communication based on a wake time period received from a single STA, as illustrated in FIGS. 2, 3, and 4, or the AP may schedule communication for multiple STAs based on the STA's wake time periods, as described in connection with FIG. 10.

Scheduling communication at 604 may include determining a target transmission time at 606 for transmitting a trigger frame to the STA(s) based on the indicated wake time period, e.g., as illustrated in FIGS. 2 and 3. The AP may then transmit a beacon/beacons to the STA(s) at 608, and at 610, the AP may transmit the trigger frame to the STA(s) at the target transmission time following the beacon. For example, transmitter 510 may transmit the beacon(s) and trigger frame to the STA(s) according to the determination made by schedule component 524.

In another example, scheduling communication with the STA(s) at 604 may include having the AP determine an offset at 612, from a beacon for transmitting downlink communication, e.g., 212, 1012, 1014, 1016 to the STA. For example, schedule component 524 at an AP may determine an offset for a broadcast from the AP to the STA with respect to a beacon transmitted by the AP.

The AP may indicate the offset to the STA at 614. For example, an offset indicator component 526 in wireless device may transmit an indication via transmitter 510. The AP may indicate the offset to the STA in a broadcast TWT IE 210a transmitted in the beacon. The AP may indicate the offset to the STA in an additional field 210b in the beacon. The AP may indicate the offset to the STA in an association response 208 frame from the AP. The AP may indicate the offset to the STA in other manners, than these examples.

The AP may use a TWT, the TWT being based on the wake time period information received from the STA 602, in order to solicit or schedule different UL responses from the STA, e.g., any of a PS-POLL response 414 from the STA, a CQI response 416 from the STA, a buffer status report 418 from the STA, block ACK frames 420 from STA, a data transmission 422 from STA, etc.

Aspects described in connection with FIG. 6 may allow the AP to take into consideration the wake time period required by the STA when initiating communication with a STA in a sleep mode. This may enable the AP to more efficiently communicate with a STA in a sleep mode without waiting for the STA to indicate its readiness after exiting the sleep mode.

Figure 7:
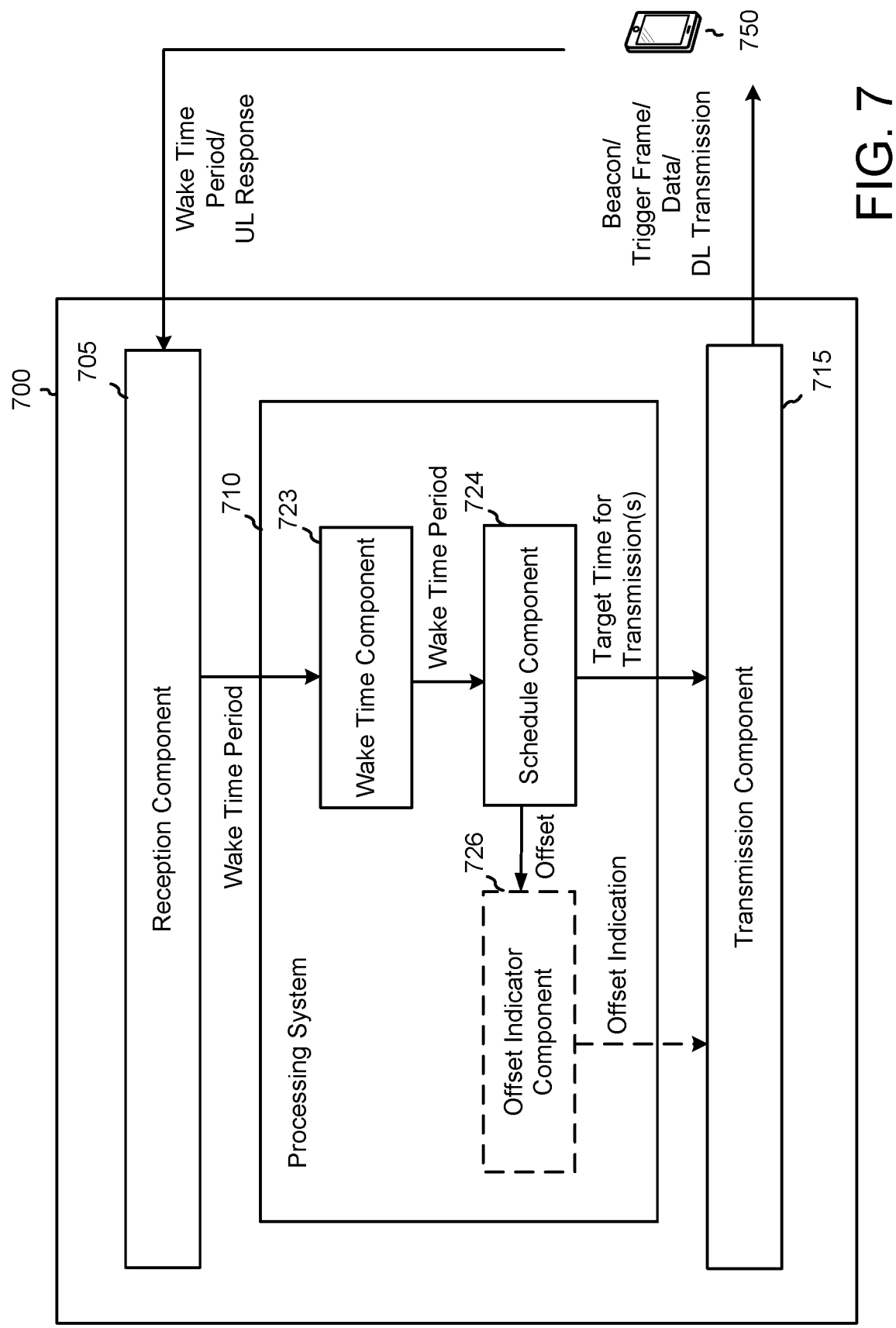
FIG. 7 shows a functional block diagram of an example wireless communication device that uses a wake time period to schedule communication with a STA.

FIG. 7 is a functional block diagram of an example wireless device 700 that receives information indicating a wake time period from a STA and uses the received wake time period to schedule communication with the STA. The wireless device may be an AP, e.g., AP 104, 204, wireless device 502. FIG. 7 illustrates an example data flow between different components in the example AP device 700. The wireless device 700 may include a reception component 705, a processing system 710, and a transmission component 715. The processing system 710 may include a wake time component 723, a schedule component 724, and/or offset indicator component 726.

In one configuration, the transmitter 715, the processing system 710, the processing system 710, the wake time component 723, the schedule component 724, and/or the offset indicator component 726 may be configured to perform one or more of the functions and/or steps recited in disclosure with respect to FIGS. 1-6. As such, each block in the aforementioned diagrams of FIGS. 2-4 and the flowchart of FIG. 6 may be performed by a component of the device 700. The components may be one or more hardware components specifically configured to carry out the stated processes/algorithm, implemented by a processor configured to perform the stated processes/algorithm, stored within a computer-readable medium for implementation by a processor, or some combination thereof.

The reception component 705 may correspond to the receiver 512. The processing system 710 may correspond to the processor 504. The transmission component 715 may correspond to the transmitter 510. The wake time component 723 may correspond to the wake time reception component 122 and/or the wake time component 523. The schedule component 724 may correspond to the schedule component 124, and/or the schedule component 524. The offset indicator component may correspond to offset indicator component 126 and/or offset indicator component 526.

Moreover, means for performing the various described function are described herein. In one configuration, the apparatus 502/700 for wireless communication includes means for receiving information indicating a wake time period from a STA, e.g., wake time component 723; means for using the received wake time period to schedule communication with the STA, e.g., schedule component 724; means for transmitting a beacon to the STA and a trigger frame to the STA at a target transmission time following the beacon, e.g., transmission component 715; and means for indicating an offset to the STA, e.g., offset component 726. The aforementioned means may be one or more of the aforementioned components of the apparatus 502 and/or the processor unit(s) 504/processing system 710 configured to perform the functions recited by the aforementioned means.

Figure 8:
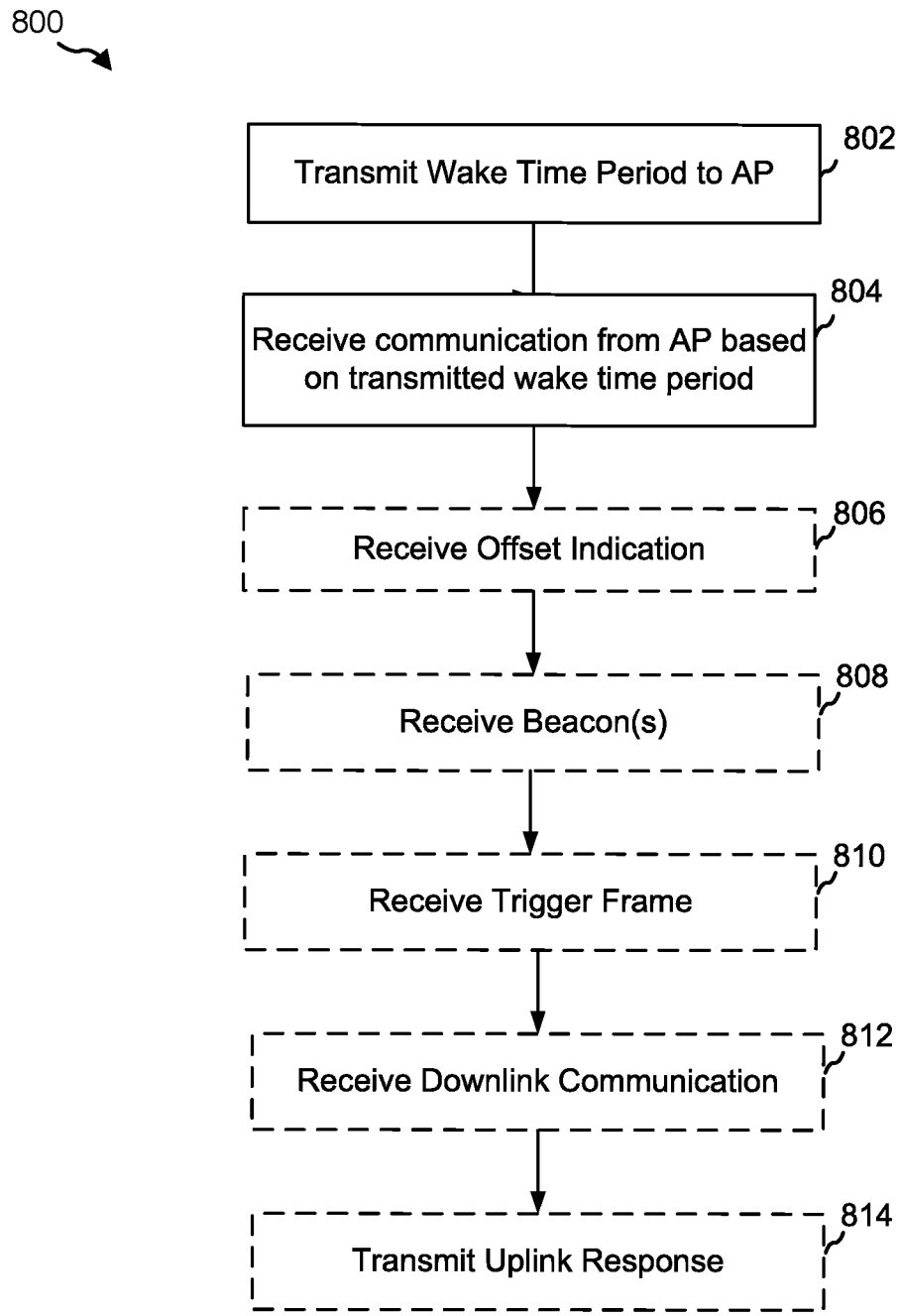
FIG. 8 shows a flowchart of an example method of wireless communication at an AP.

FIG. 8 is a flowchart of an example method 800 of wireless communication at a STA, e.g., as described in connection with FIGS. 2-4, 6, and 7. Optional aspects are illustrated using a dashed line. The method 800 may be performed using an apparatus (e.g., the STA 112, 114, 116, 118, 202, 203, 750, or the wireless device 902, for example). Although the method 800 is described below with respect to the elements of wireless device 902 of FIG. 9, other components may be used to implement one or more of the steps described herein.

At 802, the STA may transmit an indication to an AP (e.g., AP 104, 204, wireless device 502, 700) indicating a wake time period for the STA. For example, wake time component 924 may transmit the wake time period via transmitter 910, while the wireless device is in a low power mode, as configured by low power mode component 930 The indication may be transmitted to the AP in an association request frame 206, e.g., in an HE capabilities IE 207 within the association request frame indicating a duration value of the wake time period for the STA.

At 804, the STA receives communication from the AP, wherein the communication is scheduled based on the wake time period for the STA. For example, receiver 912 may receive the communication from the AP.

For example, a target transmission time for a trigger frame received from the AP may be scheduled based on the wake time period. In this example, the STA may further receive a beacon from the AP at 808 and may receive, at 810, the trigger frame from the AP at the target transmission time following the beacon. The beacon and trigger frame may be received by receiver 912.

In another example, the STA may receive a beacon from the AP at 808 and may receive downlink communication from the AP, at 812, wherein the downlink communication is offset from the beacon based on the wake time period transmitted to the AP. The beacon may be broadcast to multiple STAs, e.g., as described in connection with FIG. 10.

The STA may receive an offset indication from the AP at 806, the offset comprising an offset for a broadcast from the AP to the STA with respect to a beacon transmitted by the AP. The offset indication may be received by receiver 912. The STA may receive the indication from the AP in a broadcast TWT IE transmitted in the beacon, e.g., which may be broadcast to multiple STAs. In another example, the STA may receive the indication from the AP in an additional field in the beacon. In another example, the STA may receive the indication from the AP in an association response frame from the AP. The indicated offset may be based on the wake time period that the STA transmitted to the AP at 802. The indicated offset may also be based on the wake time period received by the AP for other STAs, e.g., as described in connection with FIG. 10.

As described in connection with FIG. 4, the AP may use a broadcast TWT in order to solicit or schedule different UL responses from the STA, e.g., any of a PS-POLL response 414 from the STA, a CQI response 416 from the STA, a buffer status report 418 from the STA, block ACK frames 420 from STA, a data transmission 422 from STA, etc. Thus, at 814, the STA may transmit an uplink response solicited based on the TWT, the TWT being based on wake time period information received from the STA at 802.

Figure 9:
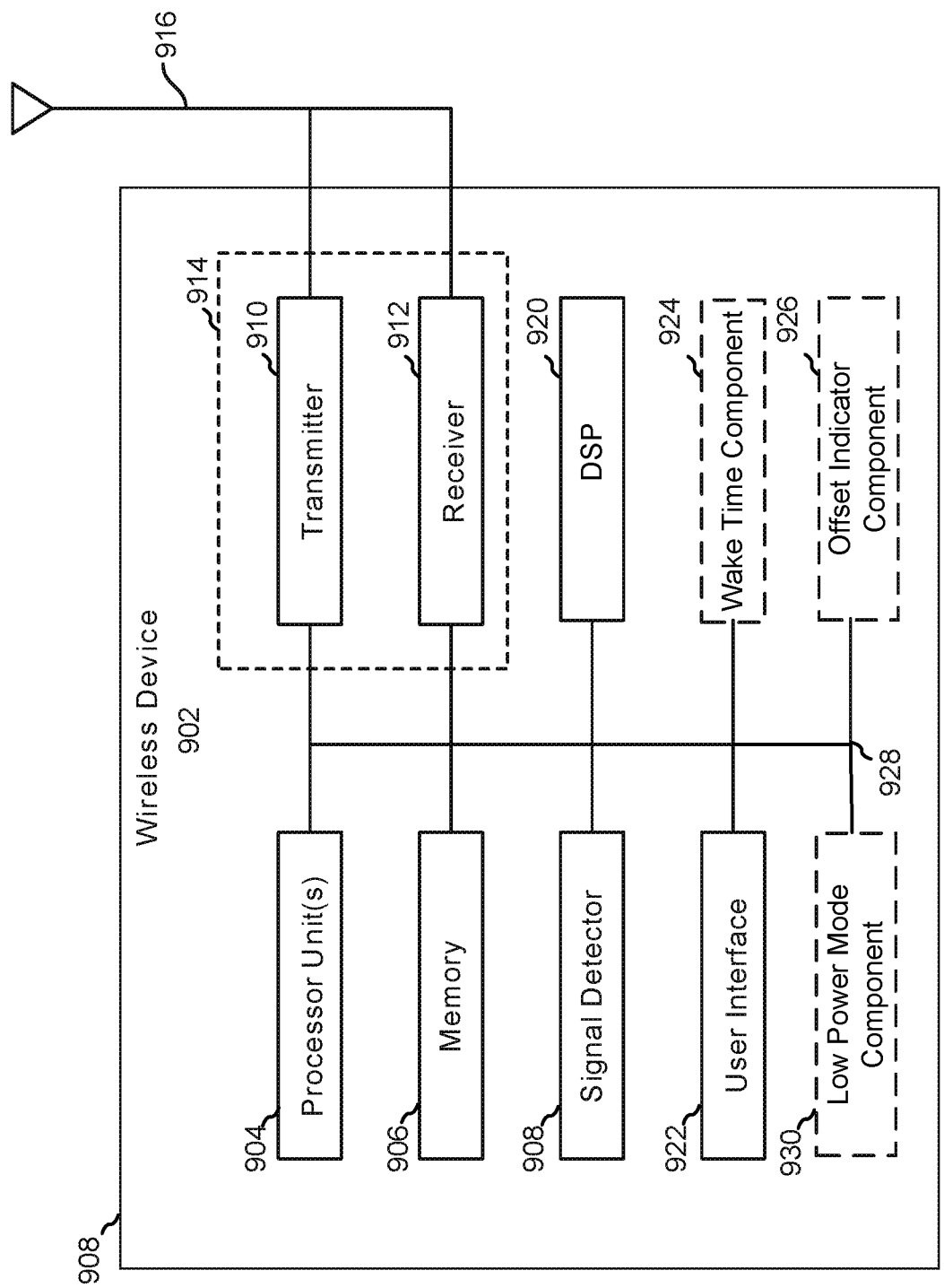
FIG. 9 shows an example functional block diagram of a wireless device that may transmit a wake time period to an AP, e.g., within the wireless communication system of FIG. 1.

FIG. 9 shows an example functional block diagram of a wireless device 902 that may communicate with an AP, e.g., within the wireless communication system 100 of FIG. 1. The wireless device 902 is an example of a device that may be configured to implement the various methods described herein, by transmitting a wake time period of a STA when communicating with an AP. For example, the wireless device 902 may comprise/be comprised in STA 112, 114, 116, 118, 202, 750.

The wireless device 902 may include at least one processor 904, which controls operation of the wireless device 902. The processor 904 may also be referred to as a central processing unit (CPU). Memory 906, which may include both read-only memory (ROM) and random access memory (RAM), may provide instructions and data to the processor 904. A portion of the memory 906 may also include non-volatile random access memory (NVRAM). The processor 904 typically performs logical and arithmetic operations based on program instructions stored within the memory 906. The instructions in the memory 906 may be executable (by the processor 904, for example) to implement the methods described herein.

The processor 904 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 902 may also include a housing 908, and the wireless device 902 may include a transmitter 910 and/or a receiver 912 to allow transmission and reception of data between the wireless device 902 and a remote device. The transmitter 910 and the receiver 912 may be combined into a transceiver 914. An antenna 916 may be attached to the housing 908 and electrically coupled to the transceiver 914. The wireless device 902 may also include multiple transmitters, multiple receivers, multiple transceivers, and/or multiple antennas.

The wireless device 902 may also include a signal detector 918 that may be used to detect and quantify the level of signals received by the transceiver 914 or the receiver 912. The signal detector 918 may detect such signals as total energy, energy per subcarrier per symbol, power spectral density, and other signals. The wireless device 902 may also include a DSP 920 for use in processing signals. The DSP 920 may be configured to generate a packet for transmission. In some aspects, the packet may comprise a physical layer convergence protocol (PLCP) data unit (PPDU).

The wireless device 902 may further comprise a user interface 922 in some aspects. The user interface 922 may comprise a keypad, a microphone, a speaker, and/or a display. The user interface 922 may include any element or component that conveys information to a user of the wireless device 902 and/or receives input from the user.

When the wireless device 902 is implemented as a STA (e.g., the STA 112, 114, 116, 118, 202, 750), the wireless device 902 may also comprise a low power mode component 930, a wake time component 924 and/or an offset indication component 926. The low power mode component 930 may be configured to operate the wireless device in a low power mode as described herein. The wake time component 924 may be configured to transmit a wake time period for a STA to an AP when the STA is in a low power mode, e.g., by performing functions and/or steps recited in disclosure with respect to FIGS. 1-4 and 7 and 8. The receiver 912 may then receive communication from the AP, wherein the communication is scheduled based on the wake time period for the STA. The receiver 912 may receive any of a beacon, a trigger frame, an offset indication, a TWT IE, an association response frame, a download transmission, etc. from the AP, which may be based on the wake time period transmitted to the AP. For example, the wireless device 902 may also comprise an offset indication component 926 configured to receive an indication of an offset from an AP, e.g., by performing functions and/or steps recited in disclosure with respect to FIGS. 1-4, 7, and 8. The various components of the wireless device 902 may be coupled together by a bus system 928. The bus system 928 may include a data bus, for example, as well as a power bus, a control signal bus, and a status signal bus in addition to the data bus. Components of the wireless device 902 may be coupled together or accept or provide inputs to each other using some other mechanism.

Although a number of separate components are illustrated in FIG. 9, one or more of the components may be combined or commonly implemented. For example, the processor 904 may be used to implement not only the functionality described above with respect to the processor 904, but also to implement the functionality described above with respect to the signal detector 918, the DSP 920, the user interface 922, the schedule component 924, the offset indication component 926, the receiver 912, and/or the transmitter 910. Further, each of the components illustrated in FIG. 9 may be implemented using a plurality of separate elements.

Moreover, means for performing the various described function are described herein. In one configuration, the apparatus 902 for wireless communication may include means for transmitting a wake time period to an AP, e.g., wake time component 924; means for receiving communication from the AP, wherein the communication is scheduled based on the wake-time period for the STA, e.g., receiver 912; means for transmitting to the AP, e.g., transmitter 910; means for receiving an indication of an offset from the AP, e.g., offset component 926; and means for operating in a low power mode, e.g., low power mode component 930. The aforementioned means may be one or more of the aforementioned components of the apparatus 902 and/or the processor unit(s) 904 configured to perform the functions recited by the aforementioned means.

The various operations of methods described above may be performed by any suitable means capable of performing the operations, such as various hardware and/or software component(s), circuits, and/or component(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an ASIC, a FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication at an access point (AP), comprising:
   receiving information from a station (STA) in a low power mode when the STA is associating with the AP, wherein the information indicates a wake time period of the STA, the wake time period comprising a time duration required by the STA to transition from the low power mode to a mode where the STA is able to communicate with the AP;
   using the wake time period to schedule communication with the STA;
   determining an offset based on the wake time period, the offset to be included in a broadcast from the AP to the STA; and
   indicating the offset to the STA.

2. The method of claim 1, wherein using the wake time period to schedule communication with the STA includes determining a target transmission time for transmitting a trigger frame to the STA based on the wake time period, the method further comprising:
   transmitting a transmission to the STA; and
   transmitting the trigger frame to the STA at the target transmission time following the transmission.

3. The method of claim 1, wherein using the wake time period to schedule communication with the STA includes determining an offset from a transmission for transmitting downlink communication to the STA.

4. The method of claim 1, wherein the information indicating the wake time period is received from the STA in an association request frame.

5. The method of claim 4, wherein the information indicating the wake time period is received from the STA in a high efficiency (HE) capabilities information element (IE) within the association request frame.

6. The method of claim 1, wherein the AP indicates the offset to the STA in a broadcast Target Wake Time (TWT) information element (IE) transmitted in the transmission.

7. The method of claim 1, wherein the AP indicates the offset to the STA in a field in the transmission.

8. The method of claim 1, wherein the AP indicates the offset to the STA in an association response frame from the AP.

9. An apparatus for wireless communication at an access point (AP), comprising:
   means for receiving information from a station (STA) in a low power mode when the STA is associating with the AP, wherein the information indicates a wake time period of the STA, the wake time period comprising a time duration required by the STA to transition from the low power mode to a mode where the STA is able to communicate with the AP;
   means for using the wake time period to schedule communication with the STA; and
   wherein the means for using the wake time period to schedule communication with the STA determines an offset based on the wake time period, the offset to be included in a broadcast from the AP to the STA, the apparatus further comprising:
   means for indicating the offset to the STA.

10. The apparatus of claim 9, wherein the means for using the wake time period to schedule communication with the STA determines a target transmission time for transmitting a trigger frame to the STA based on the wake time period, the apparatus further comprising:
    means for transmitting a transmission to the STA and the trigger frame to the STA at the target transmission time following the transmission.

11. The apparatus of claim 9, wherein the means for using the wake time period to schedule communication with the STA determines an offset from a transmission for transmitting downlink communication to the STA.

12. The apparatus of claim 9, wherein the information indicating the wake time period is received from the STA in an association request frame.

13. The apparatus of claim 12, wherein the information indicating the wake time period is received from the STA in a high efficiency (HE) capabilities information element (IE) within the association request frame.

14. The apparatus of claim 9, wherein the apparatus indicates the offset to the STA in at least one of:
    a broadcast Target Wake Time (TWT) information element (IE) transmitted in the transmission;
    a field in the transmission; and
    an association response frame from the AP.

15. An apparatus for wireless communication, comprising:
    a memory; and
    at least one processor coupled to the memory and configured to:
        receive information from a station (STA) in a low power mode when the STA is associating with the AP, wherein the information indicates a wake time period of the STA, the wake time period comprising a time duration required by the STA to transition from the low power mode to a mode where the STA is able to communicate with the AP;
use the wake time period to schedule communication with the STA;
determine an offset based on the wake time period, the offset to be included in a broadcast from the AP to the STA; and
indicate the offset to the STA.

16. The apparatus of claim 15, wherein the use of the wake time period to schedule communication with the STA includes a determination of a target transmission time for transmission of a trigger frame to the STA based on the wake time period, the at least one processor further configured to:
transmit a transmission to the STA; and
transmit the trigger frame to the STA at the target transmission time following the transmission.

17. The apparatus of claim 15, wherein the use of the wake time period to schedule communication with the STA includes a determination of an offset from a transmission for transmitting downlink communication to the STA.

18. The apparatus of claim 15, wherein the information indicating the wake time period is received from the STA in an association request frame.

19. The apparatus of claim 18, wherein the information indicating the wake time period is received from the STA in a high efficiency (HE) capabilities information element (IE) within the association request frame.

20. The apparatus of claim 15, wherein the apparatus indicates the offset to the STA in at least one of:
a broadcast Target Wake Time (TWT) information element (IE) transmitted in the transmission;
a field in the transmission; and
an association response frame from the AP.

21. A non-transitory, computer-readable medium storing computer-executable code for wireless communication by an access point (AP), comprising code to:
receive information from a station (STA) in a low power mode when the STA is associating with the AP, wherein the information indicates a wake time period of the STA, the wake time period comprising a time duration required by the STA to transition from the low power mode to a mode where the STA is able to communicate with the AP;
use the wake time period to schedule communication with the STA;
determine an offset based on the wake time period, the offset to be included in a broadcast from the AP to the STA; and
indicate the offset to the STA.

22. The computer-readable medium of claim 21, wherein the use of the wake time period to schedule communication with the STA includes a determination of a target transmission time for transmission of a trigger frame to the STA based on the wake time period, the computer-readable medium further comprising code to:
transmit a transmission to the STA; and
transmit the trigger frame to the STA at the target transmission time following the transmission.

23. The computer-readable medium of claim 21, wherein the use of the wake time period to schedule communication with the STA includes a determination of an offset from a transmission for transmitting downlink communication to the STA.

24. The computer-readable medium of claim 21, wherein the information indicating the wake time period is received from the STA in an association request frame.

25. The computer-readable medium of claim 24, wherein the information indicating the wake time period is received from the STA in a high efficiency (HE) capabilities information element (IE) within the association request frame.

26. The computer-readable medium of claim 21, wherein the offset is indicated to the STA in at least one of:
a broadcast Target Wake Time (TWT) information element (IE) transmitted in the transmission;
a field in the transmission; and
an association response frame from the AP.

27. A method of wireless communication at a station (STA), comprising:
transmitting information to an access point (AP) in a low power mode when the STA is associating with the AP, the information indicating a wake time period of the STA, wherein the wake time period comprises a time duration required by the STA to transition from the low power mode to a mode where the STA is able to communicate with the AP;
receiving communication from the AP, wherein the communication is scheduled based on the wake time period for the STA; and
receiving an offset indication from the AP, the offset indication comprising an offset based on the wake time period, the offset to be included in a broadcast from the AP to the STA.

28. The method of claim 27, wherein a target transmission time for a trigger frame received from the AP is scheduled based on the wake time period, the method further comprising:
receiving a transmission from the AP; and
receiving the trigger frame from the AP at the target transmission time following the transmission.

29. The method of claim 27, further comprising:
receiving a transmission from the AP; and
receiving downlink communication from the AP, wherein the downlink communication is offset from the transmission based on the wake time period transmitted to the AP.

30. The method of claim 27, wherein the indication is transmitted to the AP in an association request frame.

31. The method of claim 30, wherein the information indicating the wake time period is transmitted to the AP in a high efficiency (HE) capabilities information element (IE) within the association request frame.

32. The method of claim 27, wherein the indication is received from the AP in at least one of:
a broadcast Target Wake Time (TWT) information element (IE) transmitted in the transmission;
a field in the transmission; and
an association response frame from the AP.

33. An apparatus for wireless communication at a station (STA), comprising:
a memory; and
at least one processor coupled to the memory and configured to:
transmit information to an access point (AP) in a low power mode when the STA is associating with the AP, the information indicating a wake time period of the STA, wherein the wake time period comprises a time duration required by the STA to transition from the low power mode to a mode where the STA is able to communicate with the AP;
receive communication from the AP, wherein the communication is scheduled based on the wake time period for the STA; and receiving an offset indication from the AP, the offset indication comprising an offset based on the wake time period, the offset to be included in a broadcast from the AP to the STA.

* * * * *